United States Patent [19]
Aralis et al.

[11] Patent Number: 6,005,363
[45] Date of Patent: Dec. 21, 1999

[54] METHOD AND APPARATUS FOR POSITION ERROR SIGNAL (PES) MEASUREMENT IN A DISK DRIVE SERVO SYSTEM

[75] Inventors: James Aralis, Mission Viejo; Paul Walker, Tustin, both of Calif.

[73] Assignee: Texas Instruments Incorporated, Dallas, Tex.

[21] Appl. No.: 09/187,020

[22] Filed: Nov. 6, 1998

[51] Int. Cl.$^6$ .............................. G06J 1/00; G11B 5/09
[52] U.S. Cl. ..................... 318/560; 318/561; 318/609; 318/610; 364/602; 360/46; 360/51
[58] Field of Search .................... 318/560–696; 360/46, 51, 65, 50, 40, 48, 77.08; 364/602, 605; 375/350, 355, 340, 354, 376

[56] References Cited

U.S. PATENT DOCUMENTS

| | | | |
|---|---|---|---|
| 4,984,102 | 1/1991 | Fujimoto | 360/65 |
| 5,321,559 | 6/1994 | Nguyen et al. | 360/46 |
| 5,341,249 | 8/1994 | Abbott et al. | 360/46 |
| 5,345,342 | 9/1994 | Abbott et al. | 360/48 |
| 5,381,359 | 1/1995 | Abbott et al. | 364/724.19 |
| 5,422,760 | 6/1995 | Abbott et al. | 360/46 |
| 5,459,679 | 10/1995 | Ziperovich | 364/602 |
| 5,771,127 | 6/1998 | Reed et al. | 360/51 |
| 5,802,118 | 9/1998 | Bliss et al. | 375/350 |
| 5,825,570 | 10/1998 | Kanegae et al. | 360/65 |
| 5,841,602 | 11/1998 | Kanegae et al. | 360/51 |
| 5,847,891 | 12/1998 | Ohmori et al. | 360/65 |

*Primary Examiner*—Paul Ip
*Attorney, Agent, or Firm*—W. Daniel Swayze, Jr.; Wade James Brady, III; Richard L. Donaldson

[57] ABSTRACT

An apparatus for Position Error Signal (PES) measurement in a disk drive servo system includes a variable-gain amplifier that receives an analog servo signal; a multiplier coupled to the variable-gain amplifier; a low-pass filter coupled to the multiplier; a digital-to-analog converter; an analog summer that is coupled to the low-pass filter and to the digital-to-analog converter; an analog-to-digital converter coupled to the analog summer; a digital summer coupled to the analog-to-digital converter, and a phase-locked loop that provides timing signals to the multiplier, the digital-to-analog converter and the analog-to digital converter. The invention enables an output of the variable-gain amplifier to be multiplied with the clocking signal of the phase-locked loop. The multiplication output signal is then filtered by the low-pass filter. The output of the low-pass filter is summed with voltage ramp signals that are generated by the digital-to-analog converter and the resulting signals are converted to a series of 6-bit words by the digital-to-analog converter. Thereafter, the series of the 6-bit words are summed by the digital summer to generate a 10-bit PES.

20 Claims, 2 Drawing Sheets

METHOD AND APPARATUS FOR POSITION ERROR SIGNAL (PES) MEASUREMENT IN A DISK DRIVE SERVO SYSTEM

FIELD OF THE INVENTION

The present invention relates to measurements of signals in a disk drive servo system, and more particularly, to a method and apparatus for measuring the Position Error Signals (PES) in a disk servo system. While the invention is subject to a wide range of applications, it is especially suited for measuring PES that determines the location of a read/write head relative to disk tracks on a magnetic disk and will be particularly described in that context.

BACKGROUND OF THE INVENTION

In a system for reading/writing information from a magnetic disk, a magneto-resistive read/write head is used to detect magnetic information stored in substantially circular tracks on the magnetic disk. In order for the system to successfully read or record magnetic information from/to a given track on the magnetic disk, the read/write head must be precisely positioned and centered over that track. The read/write head is typically mounted on a radially-movable arm that is controlled by a disk servo control system.

The servo control system receives, from the magnetic disk surface via the read/write head, servo information signals that indicate the position of the read/write head on the magnetic disk. Conventionally, servo information is pre-recorded on the magnetic disk in the form of high-frequency magnetic flux transitions. The pattern of these magnetic flux transitions defines a binary value that typically corresponds to the track number. Accordingly, the pattern of the servo information communicated to the servo control system, via the read servo signals, identifies the specific track over which the read/write head is traveling.

The amplitude of servo information signals indicates the position of the read/write head with respect to the center of the track. With one type of magnetic media, when the amplitude of servo signals (i.e., the signal read by the read/write head when passing over the track and representing the amplitude of the servo information) is equal to zero, that indicates the read/write head is centered over the track. With another type of magnetic media, the magnetic servo information is located on either side of the track. With this type of media, an amplitude difference of zero also indicates that the read/write head is centrally positioned over the track. Conversely, a negative or positive amplitude difference corresponds to an offset between the position of the read/write head and the center of the track. In either case, once modulated, the servo signal is referred to as Position Error Signal (PES) because it feeds back to the servo control system the error associated with the position of the read/write head. Additionally, servo signals having a positive or negative amplitude indicate the extent of the displacement of the read/write head. Thus, by obtaining PES feedback, the servo control system can generate corrective control signals to adjust the position of the read/write head over the center of the track.

There have been proposed methods and circuitries for modulating servo signals into Position Error Signals. These prior art methods and circuitries typically involve the employment of an integrating capacitor for the purpose of measuring the amplitude of the analog servo signals.

For example, one prior proposed solution is shown in FIG. 1. The circuitry of FIG. 1 includes a Variable Gain Amplifier (VGA) 110, a multiplier 120, an Automatic Gain Control (AGC) circuit 140, a timing acquisition circuit 130, a charge Pump (CP) 150, an integrating capacitor 170, and an analog-to-digital converter (A/D) 180. Initially, switch 160 is opened so that no charge is accumulating in the integrating capacitor 170. Switches 133 and 147 are closed so that the AGC circuit 140 and the timing acquisition circuit 130 are in operation. Switch 190 is also closed so that capacitor 170 is not being charged. Switches 160, 133, and 147 remain in their initial state for a predetermined settlement period of time that is sufficient to (i) set the gain of the variable gain amplifier through AGC 140, and to (ii) obtain the proper timing from the timing acquisition circuit 130. During this settlement period, the VGA 110 gain is adjusted by inputting the output of VGA 110 into clipper 142 and into multiplier 144. The output of clipper 142 is then multiplied with the VGA output via multiplier 144. The current output of multiplier 144 then charges capacitor 148. The resulting voltage across capacitor 148 adjusts the gain of VGA 110. The adjustment continues for a period of time until the current output of multiplier 144 is equal to a pre-defined value of a constant current source 146. Once that equilibrium is achieved there will be no current going into capacitor 148 and, therefore, no further adjustment to the gain of VGA 110.

Additionally, during this settlement time, the timing acquisition circuit 130 locks in the phase of the output of the VGA 110 to obtain the system timing signal. This is done by qualifying the output of VGA 110 via an Automatic Pulse Qualifier (APQ) 132 and locking the phase of the output of APQ 132 via Phase Locked Loop (PLL) 134. The output timing signal is delayed for the remainder of the servo signal cycle, via Delay 136, before it is inputted into multiplier 120.

Once the predetermined settlement period expires, the VGA gain is deemed to have stabilized and the timing signal's locked phase is deemed appropriate for the timing of the system. At this time, switches 147 and 133 are opened to fix the gain of VGA and the locked phase of the timing signal. Switch 160 is then closed and switch 190 is opened to allow the charging of the integrating capacitor 170. The output of VGA is inputted into multiplier 120 and multiplied by the timing signal that is outputted from the timing acquisition circuit 130. Thereafter, the output of multiplier 120 is converted into a current signal via CP 150 and allowed to charge the integrating capacitor 170. The resulting voltage across the integrating capacitor 170 is representative of the amplitude of the servo information signal. After the integrating capacitor 170 is charged switch 160 is opened and the capacitor 170 voltage is then converted into a digital 10-bit PES via A/D 180 through a successive analog-to-digital conversion operation.

It is readily apparent to one skilled in the art that the design parameters for the prior art components (namely multiplier 144, multiplier 120, current source 146 and integrating capacitor 170) must be matched exactly in order for the above-described prior art system to obtain accurate representations of the PES value. In addition, the preset settlement period must be accurately determined in order for the system to yield an accurate result. Moreover, the total time of (i) the settlement period, (ii) the time needed for the integrating capacitor 170 to charge, and (iii) the time needed for the successive 10-bit analog-to digital conversion, introduces appreciable delay in the prior art servo control system.

What is desired is a simple system that can yield an accurate PES value without the drawbacks of the prior art design. More specifically, what is needed is a faster and more accurate system that can yield a PES value without the added delay of the prior art.

SUMMARY OF THE INVENTION

Accordingly, the present invention is directed to a method and apparatus for Position Error Signal (PES) measurement in a disk drive servo system.

A major advantage of this invention is the reduction of the delay of the servo control system by obtaining an accurate representation of the amplitude of the servo information signal without the employment of an integrating capacitor. An added advantage of the system, therefore, is the simplification of the design rules of the system due to the elimination of the integrating capacitor and the elimination of the AGC multiplication. Another advantage of the invention is a further reduction of delay by effectively obtaining 10-bit PES accuracy with a 6-bit word interval.

To achieve these and other advantages and in accordance with the purposes of the invention, the invention includes a variable-gain amplifier that receives an analog servo signal; a multiplier coupled to the variable-gain amplifier; a low-pass filter coupled to the multiplier; a digital-to-analog converter; an analog summer that is coupled to the low-pass filter and to the digital-to-analog converter; an analog-to-digital converter coupled to the analog summer; a digital summer coupled to the analog-to-digital converter, and a phase-locked loop that provides timing signals to the multiplier, the digital-to-analog converter and the analog-to digital converter. The invention enables an output of the variable-gain amplifier to be multiplied with the clocking signal of the phase-locked loop. The multiplication output signal is then filtered by the low-pass filter. The output of the low-pass filter is summed with voltage ramp signals that are generated by the digital-to-analog converter and the resulting signals are converted to a series of 6-bit words by the digital-to-analog converter. Thereafter, the series of 6-bit words are summed by the digital summer to generate a 10-bit PES.

It is understood that both the foregoing general description and the following detailed description are exemplary and explanatory and are intended to provide further explanation of the invention as claimed.

The accompanying drawings, included to provide a further understanding of the invention and incorporated in and constituting a part of this specification, illustrate several embodiments of the invention and together with the description serve to explain the principles of the invention.

BRIEF DESCRIPTION OF THE DRAWING FIGURES

The purpose and advantages of the present invention will be apparent to those skilled in the art from the following detailed description in conjunction with the appended drawings in which like reference characters are used to indicate like elements, and in which:

FIG. 1 illustrates a prior art system for generating Position Error Signals; and FIG. 2 depicts a preferred embodiment of the invention.

DETAILED DESCRIPTION OF THE PREFERRED EMBODIMENT OF THE INVENTION

Reference will now be made in detail to the present preferred embodiments of the invention, examples of which are illustrated in the accompanying drawings.

Figure 1:
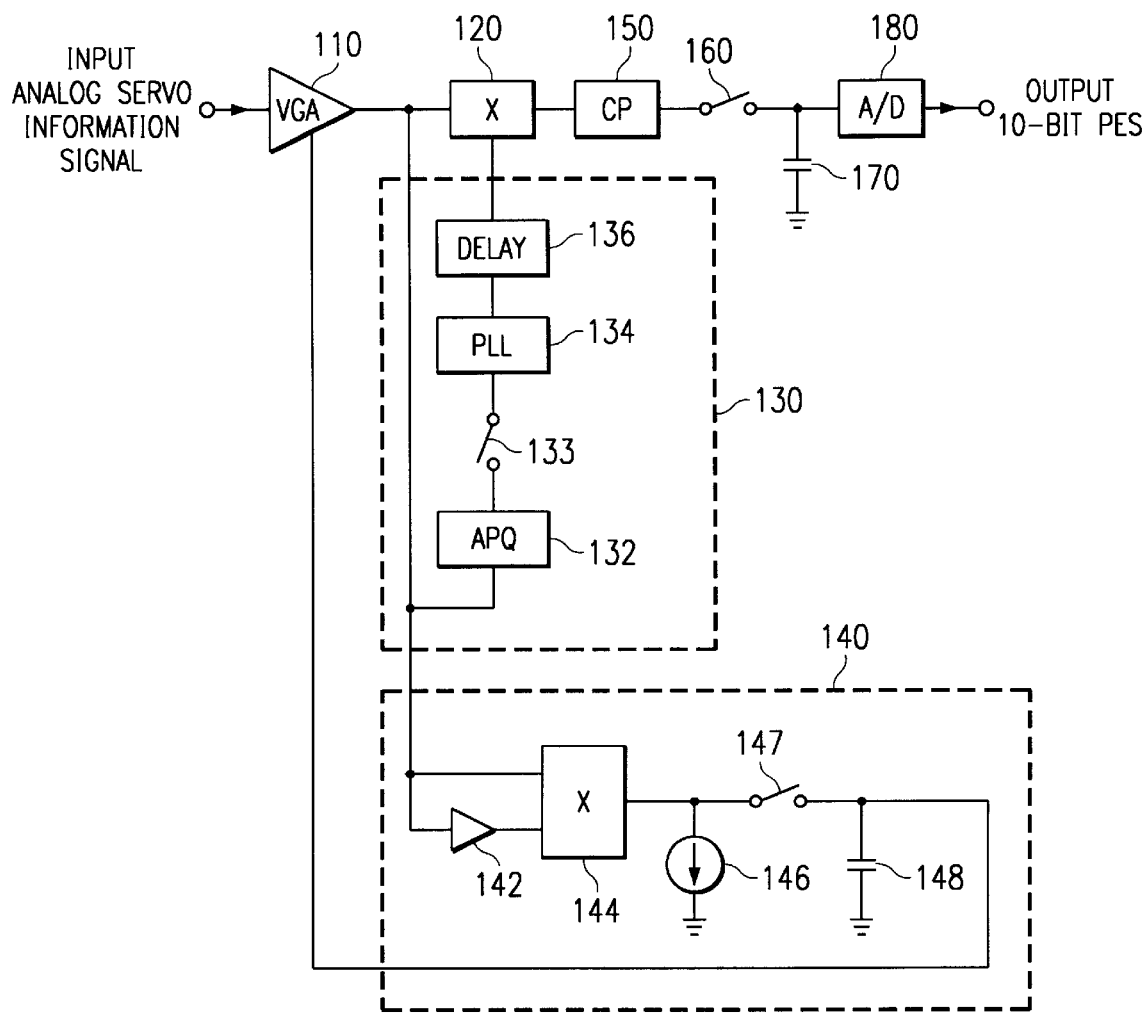
Figure 2:
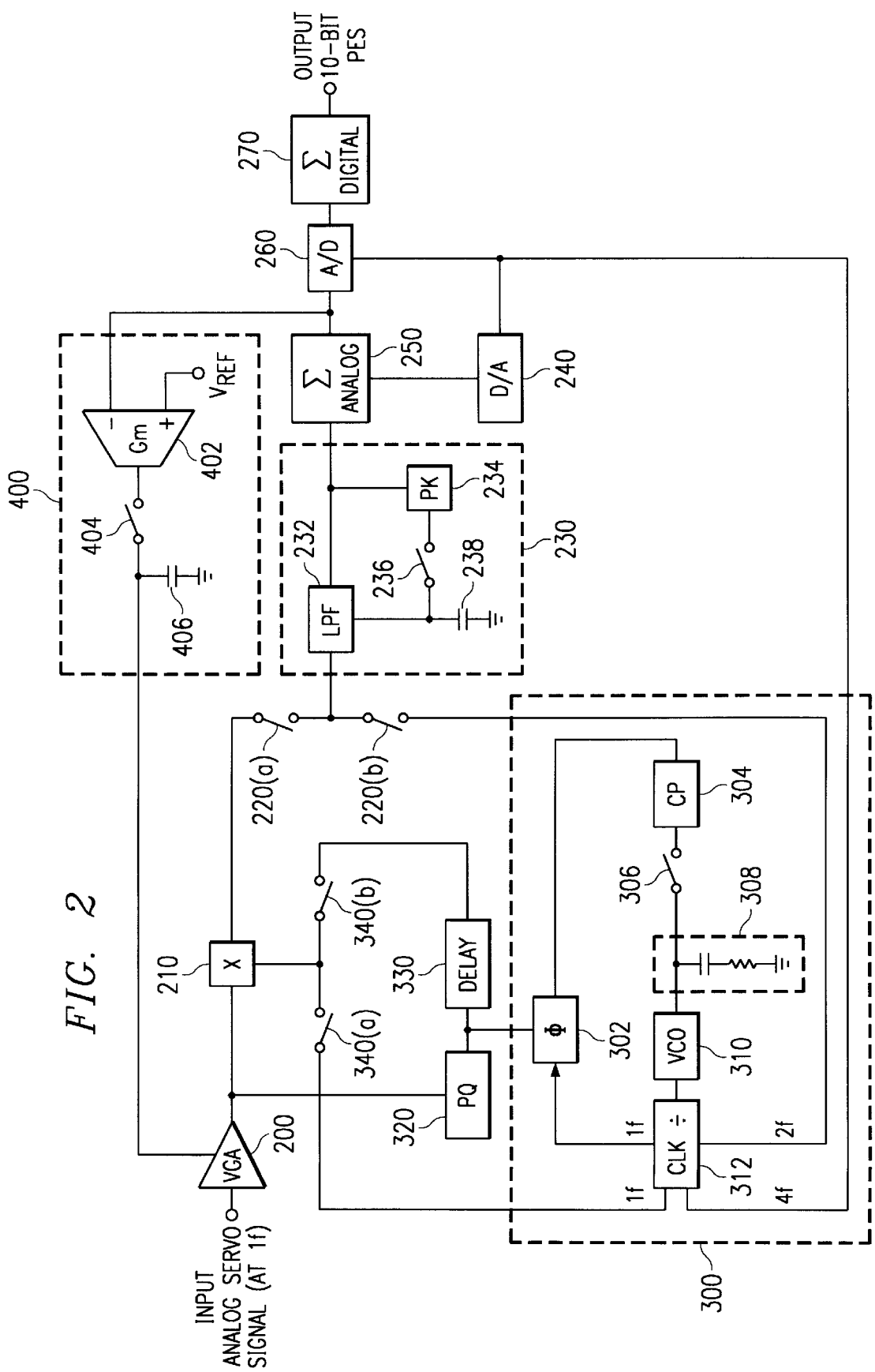

FIG. 2 illustrates a novel servo control system designed to measure PES. As FIG. 2 shows, the system comprises a Variable Gain Amplifier (VGA) 200, a multiplier 210, a self-tuning low pass filter circuit 230, a digital-to-analog converter (D/A) 240, an analog summing amplifier 250, a 6-bit flash analog-to-digital converter (A/D) 260, a digital summing amplifier 270, a Phase Locked Loop circuit (PLL) 300, a Pulse Qualifier (PQ) 320, a programmable delay circuit 330, and an Automatic Gain Control circuit 400. The system further includes switches (namely 220(*a*), 220(*b*), 236, 340(*a*), 340(*b*), 306, and 404) that control the flow of signals in the system at the different stages of operation.

The first stage of operation involves the acquisition of timing signals for the system and the gain setting of VGA 200. Throughout this stage, switches 220(*a*), 340(*b*), 306, and 404 are closed. Switches 220(*b*), 236, and 340(*a*) are open. With this configuration, there are two loops in operation: (i) the Phase Locked Loop 300 and (ii) the Automatic Gain Control 400. The loops' operation begin as the servo information signal is inputted into VGA 200. The output of VGA 200 is passed to PQ 320 for pulse qualification. The output of PQ 320 is passed to PLL 300 for the phase locking operation. The PLL circuit 300 comprises the traditional components for phase detection (block 302), current conversion (via Charge Pump 304), low-pass filtering (block 308), voltage-controlled oscillation (block 310) and clock division 312. In the phase locking operation, one output of Clock Divider 312, which has the same frequency as the input servo signal (f), is fed back into the phase detector 302 to complete the loop and to achieve normal phase locking to the phase of the output signal of PQ 320.

While this phase locking operation is in progress, the output of PQ 320 is also inputted into programmable delay block 330. Programmable delay block 330 is programmed to substantially match the delay of phase detector 302 of phase locked loop 300. Because of the matching, the output of PQ 320 is delayed by an amount of time that is equal to the processing delay of phase detector block 302. Accordingly, the output of delay block 330 will be in phase with the output timing signals of Clock Divider 312.

The output of programmable delay 330 is then multiplied with the output of VGA 200 via multiplier 210. The output of multiplier 210 is filtered via the self-tuning low-pass filter block 230. The output of block 230 is then passed through the analog summing amplifier 250. Analog summing amplifier 250 sums the output of block 230 with a constant-voltage analog signal that is outputted from D/A 240. D/A 240, however, is clocked with a timing signal that is generated by Clock Divider 312. Thus, the summing operation at the analog summing amplifier 250 is accurate if the output of filter 230 and the output of D/A 240 are in phase. This phase matching is ensured because the programmable delay block 330 delays the output of the self-tuning filter 230 so that it is in phase with the output signals of Clock Divider 312.

The output of summer 250 is fed back into the AGC circuit 400 to adjust the gain of VGA 200. This is done by converting the output of the analog summing amplifier 250 to a current signal via the Gilbert stage (block 402) in the AGC feedback circuit 400 so that capacitor 406 is charged to adjust the gain of VGA 200.

The first stage of phase locking and gain adjusting continues for the duration of the settlement period. However, even when the phase locking operation is discontinued, Clock Divider 312 continues to provide the system with timing signals throughout the second and third stages.

After the completion of the first stage, the second stage of operations, which involves the measurement of PES, is initiated. This stage lasts for the remainder of time that the read/write head is traveling over the servo information fluxes. During this second stage, switches 220(*b*) and 236 remain opened while switch 220(*a*) remains closed. Meanwhile, switches 306 and 404 are opened to cease the operations of the AGC circuit 400 and the PLL circuit 300. During this stage, switch 340(*b*) is open and switch 340(*a*) is closed so that one output of Clock Divider 312 that has the input servo signal frequency (f) is fed into multiplier 210 and multiplied with the output of VGA 200.

As is readily apparent to those skilled in the art, the result of multiplying two signals will be a signal that has two components: one component having a first frequency that is equal to the sum of the multiplied frequencies, and another component that has a second frequency that is equal to the difference of the multiplied frequencies. In this system, the multiplied signals have the same frequency (f). Accordingly, the output signal of multiplier 210 will have a first component having twice the input frequency (2f) and a second component having a zero frequency (i.e., a DC component). When the output of multiplier 210 is filtered via the self-tuning low-pass filter 230, which is initially set for filtering signals having a frequency of 2f, the output of the self-tuned low-pass filter block 230 will ideally contain the DC component. This DC output of block 230 is then summed at the analog summing amplifier 250 with the output of D/A 240. The self-tuning low-pass filter block 230 is designed to have a faster response time (thereby increasing the overall system response time). The output of filter 230, however, will have a small 2f ripple. The system can tolerate such filtering imperfection (about 5% ripple) if sampling is done at the peak of the 2f ripple. This sampling precision is possible due to the phase-locking of the first stage.

D/A 240 receives a digital clocking signal of frequency 4f from Clock Divider 312. The function of D/A 240 is to produce a 16 level voltage ramp at its 4f clocking frequency. Thus, for the duration of four cycles of the read servo signal (which has a frequency of f), the D/A 240 produces sixteen different levels of voltages, each level being one step above the preceding level. Accordingly, analog summing amplifier 250 sums the output of the self-tuning low-pass filter block 230 with each of the sixteen levels of D/A 240. The output of analog summing amplifier 250, for each of the sixteen levels of D/A 240, is substantially instantaneously converted to a 6-bit digital word by the 6-bit flash A/D 260. Thereafter, digital summing amplifier 270 sums each of the sixteen 6-bit words output from the 6-bit flash A/D 260 to obtain the 10-bit PES value.

It is readily apparent to those skilled in the art that, in this second stage of operation, the A/D sampling can occur as soon as the output of the self-tuned low-pass filter block 230 is settled. This feature greatly reduces the delay of the servo control system because of the elimination of the successive integration of the prior art. In addition, the employment of the programmable delay block 330, during the first stage of operation, eliminates the need for re-phasing of the phase locked loop, as required by the prior art. Moreover, the use of the same multiplier (namely multiplier 210) in both stages of operations greatly simplifies the circuit and eliminates the need for exact matching between the two multipliers employed by the prior art. In fact, the use of the same multiplier for both stages in this invention allows the system to be tolerant of offset current because the multiplier that is used for setting the gain of VGA 200 is the same as the multiplier that operates during the measurement of PES.

The third and final stage of operation occurs after the read/write head has completely mapped a given servo sector and before the read/write head arrives to the subsequent servo sector. During this final stage, switch 220(*a*) is opened and switches 220(*b*) and 236 are closed. With switch 220(*b*) closed, the 2f clocking signal outputted form Clock Divider 312 is inputted into the Low Pass Filter (LPF) 232 to allow the self-tuning operation of block 230.

Block 230 uses the 2f clocking signal is to optimize LPF 232 to filter out the aforementioned 2f component of the output of multiplier 210 during the subsequent PES measurement operation. This self tuning is achieved by feeding back the output of LPF 232 through peak detector (PK) 234. The output of PK 234 is then used to charge integrating capacitor 238. The resulting voltage across capacitor 236 serves to tune the pass band of LPF 232 to optimally reject 2f signals. Upon the completion of this self-tuning of block 230, switches 236 and 220(*b*) are opened so that the system is ready for subsequent iterations of operation stages.

It will be apparent to those skilled in the art that various modifications and variations can be made in the measurement of Position Error Signal (PES) in a disk drive servo system of the present invention without departing from the spirit or scope of the invention. Thus, it is intended that the present invention cover modifications and variations of this invention that come within the scope of the appended claims and their equivalents.

What is claimed is:

1. A servo control system comprising:
    a) a variable-gain amplifier that receives an analog servo signal;
    b) a multiplier coupled to said variable-gain amplifier;
    c) a first low-pass filter coupled to said multiplier;
    d) a digital-to-analog converter;
    e) an analog summer coupled to said first low-pass filter and to said digital-to-analog converter;
    f) an analog-to-digital converter coupled to said analog summer; and
    g) a digital summer coupled to said analog-to-digital converter.

2. The servo control system of claim 1 further comprising:
    a) a pulse qualifier coupled to said variable-gain amplifier; and
    b) a phase-locked loop coupled to: said pulse qualifier, said multiplier, said first low-pass filter, said digital-to-analog converter, and said digital-to-analog converter.

3. The servo control system of claim 2 wherein said analog servo signal has a first frequency, and wherein said phase-locked loop: provides said multiplier with a first clocking signal at said first frequency of said servo signal, provides said first low-pass filter with a second clocking signal at a second frequency amounting to twice the first frequency of said analog servo signal, and provides said analog-to-digital converter and said digital-to-analog converter with a third clocking signal at a third frequency amounting to four times the first frequency of said analog servo signal.

4. The servo control system of claim 3, wherein said phase-locked loop further comprises:
    a) a phase detector coupled to said pulse qualifier, wherein said phase detector has a processing delay;
    b) a charge pump coupled to said phase detector;
    c) a second low-pass filter coupled to said charge pump;
    d) a voltage-controlled oscillator coupled to said second low-pass filter; and
    e) a clock divider coupled to said voltage-controlled oscillator and to said phase detector, wherein said clock divider provides said first clocking signal, said second clocking signal, and said third clocking signal.

5. The servo control system of claim 4 further comprising a delay circuit coupled to said pulse qualifier and to said multiplier; wherein said delay circuit functions to delay an output of said pulse qualifier by a period of time that equals to the processing delay of said phase detector so that an output of said delay circuit is in phase with said first clocking signal, said second clocking signal, and said third clocking signal.

6. The servo control system of claim 1 further comprising:
   a) a peak detector coupled to said first low-pass filter; and
   b) a first integrating capacitor coupled to said peak detector and said first low pass filter.

7. The servo control system of claim 1 further comprising an automatic gain control circuit, wherein said automatic control circuit further comprises:
   a) a transconductance element coupled to said analog summer;
   b) a second integrating capacitor coupled to said transconductance and to said variable-gain amplifier.

8. The servo control system of claim 1 wherein said digital-to-analog converter outputs a plurality of voltage signals, wherein each of said plurality of voltage signals having a unique voltage level, wherein said analog summer sums each of said plurality of voltage signals with an output of said first low-pass filter to produce a plurality of summed voltage signals, wherein said analog-to-digital converter converts said plurality of summed voltage signal into a plurality of digital signals, and wherein said digital summer successively sums said plurality of digital signal to output a 10-bit position error signal.

9. A method for measuring position error signal (PES), comprising the steps of:
   receiving servo signal at a variable gain amplifier (VGA);
   multiplying the output of the VGA and the output of a programmable delay at a multiplier;
   filtering the output of the multiplier at a low-pass filter; and
   summing the output of the low-pass filter and a constant voltage analog signal at an analog summer.

10. The method of claim 9, further comprising the steps of:
    receiving the output of the analog summer at an automatic gain control (AGC); and
    adjusting the gain of the VGA by the output of the AGC.

11. The method of claim 9, further comprising the steps of:
    digitizing the output of the analog summer at an analog to digital (A/D) converter; and
    summing the output of the A/D converter at a digital summer to obtain the PES.

12. The method of claim 9, further comprising the steps of:
    receiving the output from the VGA at a pulse qualifier (PQ) for pulse qualification;
    receiving the output from the PQ at a phase locked loop (PLL) for phase locking operation; and
    receiving the output of the PQ at the programmable delay block for phase matching.

13. The method of claim 9, wherein the output of the multiplier has two components, one component being equal to the sum of the multiplied frequencies, and another component being equal to the difference between the multiplied frequencies.

14. The method of claim 10, further comprising the steps of:
    converting the output of the analog summer to a current signal via a Gilbert stage; and
    charging a first capacitor with the current signal.

15. The method of claim 11, further comprising the step of converting the output of the analog summer to a 6-bit digital word by the A/D converter.

16. The method of claim 11, further comprising the steps of:
    receiving the output of the low-pass filter at a peak detector;
    charging a second capacitor by the peak detector output; and
    adjusting the pass-band of the low-pass filter by the voltage across the second capacitor.

17. A system for measuring position error signal (PES), comprising:
    a variable gain amplifier (VGA) means for amplifying a servo signal;
    means for multiplying the output of the VGA means with a delay signal;
    means for filtering the output of the multiplying means; and
    analog summing means for summing the output of the filtering means.

18. The system of claim 17, further comprising means for adjusting the gain of the VGA.

19. The system of claim 17, further comprising:
    means for digitizing the output of the summing means; and
    digital summing means for summing the output of the digitizing means to obtain the PES.

20. The system of claim 17, further comprising:
    means for pulse qualifying the output from the VGA; and
    means for phase locking.

* * * * *